United States Patent
Cai et al.

(10) Patent No.: US 10,890,061 B2
(45) Date of Patent: Jan. 12, 2021

(54) RIG MANAGEMENT SYSTEM FOR ANALYZING A PUMP VALVE OF A HYDRAULIC FRACTURING SYSTEM

(71) Applicant: Caterpillar Inc., Deerfield, IL (US)

(72) Inventors: Zhijun Cai, Dunlap, IL (US); Yanchai Zhang, Dunlap, IL (US); Zhaoxu Dong, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 351 days.

(21) Appl. No.: 16/110,684

(22) Filed: Aug. 23, 2018

(65) Prior Publication Data

US 2020/0063548 A1    Feb. 27, 2020

(51) Int. Cl.
| | |
|---|---|
| *E21B 47/008* | (2012.01) |
| *F16K 37/00* | (2006.01) |
| *E21B 43/26* | (2006.01) |
| *G01M 13/003* | (2019.01) |
| *E21B 43/12* | (2006.01) |

(52) U.S. Cl.
CPC ........ *E21B 47/008* (2020.05); *F16K 37/0083* (2013.01); *E21B 43/126* (2013.01); *G01M 13/003* (2019.01)

(58) Field of Classification Search
CPC .... E21B 43/26; E21B 43/2607; E21B 47/008; E21B 47/009; F16K 37/0075; F16K 37/0083; F16K 37/0091; G01M 13/003
See application file for complete search history.

(56) References Cited

U.S. PATENT DOCUMENTS

| | | | |
|---|---|---|---|
| 7,069,183 B2 | 6/2006 | Schluecker et al. | |
| 7,643,945 B2 | 1/2010 | Baklanov et al. | |
| 8,979,505 B2 | 3/2015 | Pessin et al. | |
| 10,436,766 B1* | 10/2019 | Bayyouk | E21B 47/00 |
| 2008/0006089 A1* | 1/2008 | Adnan | F04B 51/00 |
| | | | 73/587 |
| 2008/0066911 A1* | 3/2008 | Luharuka | E21B 43/267 |
| | | | 166/283 |
| 2008/0162058 A1* | 7/2008 | Baklanov | G01M 3/24 |
| | | | 702/48 |

(Continued)

FOREIGN PATENT DOCUMENTS

| | | |
|---|---|---|
| CN | 106762592 A | 5/2017 |
| WO | 2017197450 A1 | 11/2017 |

*Primary Examiner* — Regis J Betsch
(74) *Attorney, Agent, or Firm* — Harrity & Harrity LLP

(57) ABSTRACT

A rig management system is disclosed. The rig management system may gather, from a set of sensors, data that includes: vibration data related to vibration of a valve associated with a pump of a hydraulic fracturing rig during operation of the pump, and pump speed data related to a speed of the pump during operation of the pump. The rig management system may process the data to identify a trend related to the vibration data, wherein the vibration data has been normalized based on the pump speed data. The rig management system may determine a remaining useful life of the valve based on the trend and threshold data that identifies a set of thresholds related to the vibration of the valve. The rig management system may determine that the remaining useful life satisfies a threshold. The rig management system may schedule an operation to be performed on the valve.

20 Claims, 7 Drawing Sheets

(56) References Cited

U.S. PATENT DOCUMENTS

| | | | |
|---|---|---|---|
| 2008/0279706 A1* | 11/2008 | Gambier | F04B 53/1025 |
| | | | 417/455 |
| 2010/0183448 A1* | 7/2010 | Leugemors | F04B 49/22 |
| | | | 417/53 |
| 2014/0005960 A1* | 1/2014 | Anderson | F16K 37/0083 |
| | | | 702/56 |
| 2015/0122037 A1 | 5/2015 | Obaia et al. | |
| 2016/0208794 A1 | 7/2016 | Singh et al. | |
| 2017/0090457 A1 | 3/2017 | Pandurangan et al. | |

* cited by examiner

RIG MANAGEMENT SYSTEM FOR ANALYZING A PUMP VALVE OF A HYDRAULIC FRACTURING SYSTEM

TECHNICAL FIELD

The present disclosure relates generally to a rig management system and, more particularly, to a rig management system for analyzing a pump valve of a hydraulic fracturing rig.

BACKGROUND

During use of a hydraulic fracturing rig, a valve associated with a pump of the hydraulic fracturing rig may experience wear and tear (e.g., normal and/or abnormal wear and tear), a failure, and/or the like. In some cases, the wear and tear, the failure, and/or the like may impact a useful life of the valve. For example, a rate of wear and tear on the valve may cause the valve to need to be replaced, may increase or decrease an expected useful life of the valve, may cause a failure of the valve, and/or the like. In addition, some operating conditions of the hydraulic fracturing rig (e.g., inlet pressure, outlet pressure, soil condition, type of fluid used, humidity, temperature, and/or the like) may impact the useful life of the valve. Accurately predicting the useful life of the valve based on these factors can be difficult, if not impossible. This results in downtime for the hydraulic fracturing rig due to the useful life of the hydraulic fracturing rig elapsing faster than expected, results in added costs by causing spare valves and back-up spare valves to have to be stored at a worksite of the hydraulic fracturing rig, and/or the like.

One attempt at pump integrity detection, monitoring, and alarm generation is disclosed in U.S. Patent Application Publication No. 2017/0090457 that published on Mar. 30, 2017 ("the '457 publication"). In particular, the '457 publication discloses a method of monitoring a fluid pump that includes receiving time domain measurement data indicating vibrations occurring in a fluid pump, and filtering the measurement data to remove measurement data components having frequencies below a threshold frequency. The method further includes comparing the peak count with an expected peak count, and determining whether the pump is in a condition selected from at least one of a wear condition and a failure condition based on the comparison.

While the method of the '457 publication may determine whether the pump is in a condition selected from at least one of a wear condition and a failure condition based on a comparison, the '457 publication does not account for operating conditions of the pump when determining whether the pump is in a condition, does not schedule and/or detect maintenance and/or replacement of the valve, and/or the like.

The rig management system of the present disclosure solves one or more of the problems set forth above and/or other problems in the art.

SUMMARY

According to some implementations, the present disclosure is related to a method, comprising: gathering, by a device and from a set of sensors, data that includes: vibration data related to vibration of a valve associated with a pump of a hydraulic fracturing rig during operation of the pump, and pump speed data related to a speed of the pump during operation of the pump; processing, by the device, the data to identify a trend related to the vibration data, wherein the vibration data has been normalized based on the pump speed data; determining, by the device, a remaining useful life of the valve based on the trend and threshold data that identifies a set of thresholds related to the vibration of the valve; determining, by the device, that the remaining useful life satisfies a threshold after determining the remaining useful life; and scheduling, by the device, an operation to be performed on the valve after determining that the remaining useful life of the valve satisfies the threshold.

According to some implementations, the present disclosure is related to a rig management system, comprising: one or more memories; and one or more processors, communicatively coupled to the one or more memories, configured to: gather, from a set of sensors, data that includes: vibration data related to vibration of a valve associated with a pump of a hydraulic fracturing rig during operation of the pump, and pump speed data related to a speed of the pump during operation of the pump; normalize the vibration data based on the pump speed data after gathering the data from the set of sensors; determine a remaining useful life of the valve after normalizing the vibration data, wherein the remaining useful life of the valve is based on threshold data that identifies a set of thresholds related to the vibration of the valve; determine that the remaining useful life satisfies a threshold after determining the remaining useful life; and schedule an operation of the valve after determining that the remaining useful life of the valve satisfies the threshold.

According to some implementations, the present disclosure is related to a hydraulic fracturing rig that includes a pump, an inlet pipe connected to the pump, an outlet pipe connected to the pump, and a set of valves associated with the inlet pipe, and the outlet pipe, the hydraulic fracturing rig comprising: a rig management system configured to: gather, from a set of sensors, data that includes: vibration data related to vibration of a valve, of the set of valves, during operation of the hydraulic fracturing rig, or pump speed data related to a speed of the pump during operation of the hydraulic fracturing rig; perform a statistical analysis on the data after gathering the data, wherein the statistical analysis is related to normalizing the data or determining a remaining useful life of the valve; determine the remaining useful life of the valve after performing the statistical analysis on the data; determine that the remaining useful life satisfies a threshold after determining the remaining useful life; schedule an operation of the valve after determining that the remaining useful life of the valve satisfies the threshold; and detect the operation of the valve utilizing updated vibration data or updated pump speed data after scheduling the operation, wherein the updated vibration data or the updated pump speed data is gathered from the set of sensors.

DETAILED DESCRIPTION

This disclosure relates to a rig management system. The rig management system has universal applicability to any machine utilizing such a rig management system. The term "machine" may refer to any machine that performs an operation associated with an industry such as, for example, mining, construction, farming, transportation, or any other industry. As some examples, the machine may be hydraulic fracturing rig, a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment.

Figure 1:
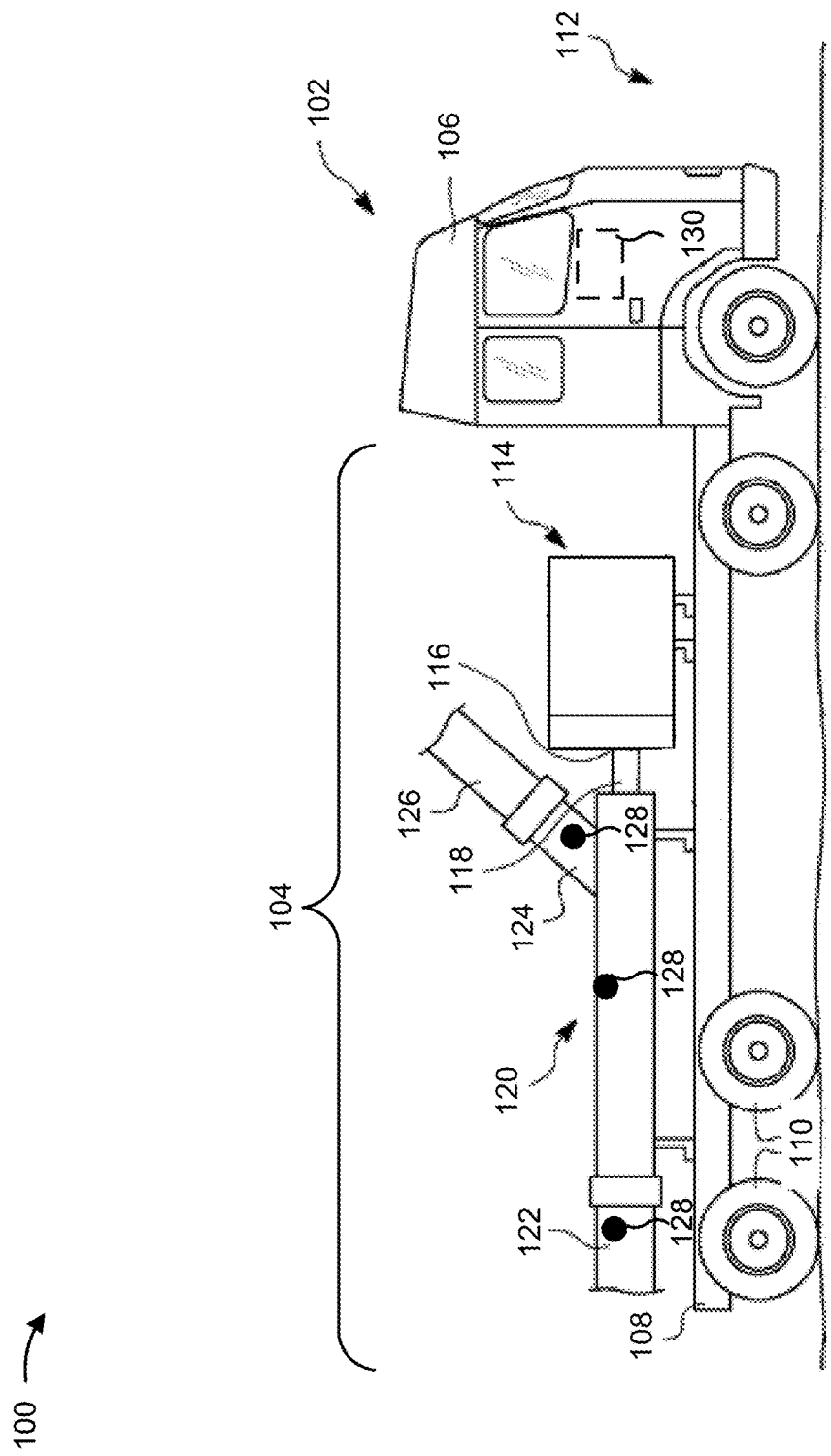
FIG. 1 is a diagram of an example hydraulic fracturing system that includes a rig management system for analyzing a pump valve of the hydraulic fracturing system described herein.

FIG. 1 is a diagram 100 of an example hydraulic fracturing system that includes a rig management system for analyzing a pump valve of the hydraulic fracturing system described herein.

As shown, FIG. 1 includes a hydraulic fracturing system 102 that may include one or more machines related to hydraulic fracturing. For example, the one or more machines are shown as a hydraulic fracturing rig 104 and an operator control station 106. Hydraulic fracturing rig 104 may be mobile and may be towed by operator control station 106. In some implementations, hydraulic fracturing rig 104 may be operatively connected to operator control station 106 such that an operator may operate hydraulic fracturing rig 104 from operator control station 106.

Hydraulic fracturing rig 104 may include one or more elements. The one or more elements of hydraulic fracturing rig 104 may include a frame 108, such as a frame of a flatbed trailer, a chassis, and/or the like. In some implementations, frame 108 may include ground engaging members 110, such as wheels (shown in FIG. 1), a jack (e.g., a drop leg jack), and/or the like. In some implementations, hydraulic fracturing system 102 may be deployed to a worksite 112, such as a site for hydraulic fracturing. In some implementations, different worksites 112 may include different operating conditions, such as different temperatures, different humidity levels, different foundation firmness for different foundations on which hydraulic fracturing system 102 may be deployed (e.g., soil, clay, rock, and/or the like), and/or the like. Different operating conditions may impact operation of hydraulic fracturing rig 104, as described elsewhere herein.

As further shown in FIG. 1, hydraulic fracturing rig 104 may include an engine 114. Engine 114 may be a combustion powered engine, such as a gasoline powered engine, a diesel engine, and/or the like, an electric engine, a hybrid combustion and electric engine, and/or the like. In some implementations, engine 114 may power one or more other elements of hydraulic fracturing rig 104, such as a transmission 116, a driveshaft 118, a set of bearings associated with transmission 116 and/or driveshaft 118 (not shown in FIG. 1), a hydraulic fracturing pump 120, and/or an outlet pipe 122. In some implementations, torque from engine 114 may be transferred through transmission 116 to hydraulic fracturing pump 120 using driveshaft 118. In some implementations, outlet pipe 122 may discharge pressurized fracturing fluid into a bore in worksite 112.

As further shown in FIG. 1, hydraulic fracturing rig 104 may include an inlet pipe 124. For example, inlet pipe 124 may be connected to hydraulic fracturing pump 120. In some implementations, hydraulic fracturing rig 104 may include a conduit 126. In some implementations, fracturing fluid may flow into hydraulic fracturing pump 120 via inlet pipe 124 and/or conduit 126.

As further shown in FIG. 1, hydraulic fracturing rig 104 may include a set of sensors 128 (e.g., installed on hydraulic fracturing pump 120, outlet pipe 122, inlet pipe 124, and/or the like). For example, the set of sensors 128 may be configured to detect a vibration of a set of valves associated with hydraulic fracturing pump 120, a pump speed of hydraulic fracturing pump 120 during operation of hydraulic fracturing rig 104, and/or the like. For example, the set of sensors 128 may detect vibration data and/or pump speed data to be used to detect a possible failure of a valve, and/or to determine an amount of wear and tear that the valve has experienced, such as based on vibration of one or more elements of hydraulic fracturing rig 104 during use of hydraulic fracturing rig 104 at a pump speed. In some implementations, the set of sensors 128 may be installed on various elements to monitor for vibration during use of hydraulic fracturing rig 104 and/or a pump speed of hydraulic fracturing pump 120. For example, the set of sensors 128 may be installed on hydraulic fracturing pump 120, outlet pipe 122, inlet pipe 124, and/or the like and may be electrically connected to one or more systems described herein.

As further shown in FIG. 1, hydraulic fracturing system 102 may include a rig management system 130. In some implementations, rig management system 130 may be implemented by a computing device associated with operator control station 106. In some implementations, rig management system 130 may be implemented by a computing device associated with hydraulic fracturing rig 104 (e.g., may be implemented by a computer configured in hydraulic fracturing pump 120). In some implementations, rig management system 130 may be electronically connected to the set of sensors 128, as described elsewhere herein (e.g., via wired or wireless connections).

In some implementations, rig management system 130 may be implemented at a location different from that described above (e.g., may be implemented remote from hydraulic fracturing system 102). For example, rig management system 130 may be cloud-based and/or deployed in a data center and may be in communication with hydraulic fracturing rig 104 and/or operator control station 106 via a network (e.g., the Internet, a cellular network, and/or the like).

In some implementations, rig management system 130 may perform an analysis of vibration data that identifies a vibration of a valve associated with hydraulic fracturing pump 120, such as to determine a remaining useful life of the valve, to detect a failure of the valve, and/or the like. For example, rig management system 130 may receive vibration data and/or pump speed data from the set of sensors 128, and may process the vibration data and/or the pump speed data to determine a remaining useful life of a valve associated with hydraulic fracturing pump 120. These and/or other functions of rig management system 130 are described elsewhere herein.

As indicated above, FIG. 1 is provided as an example. Other examples are possible and may differ from what was described in connection with FIG. 1.

Figure 2:
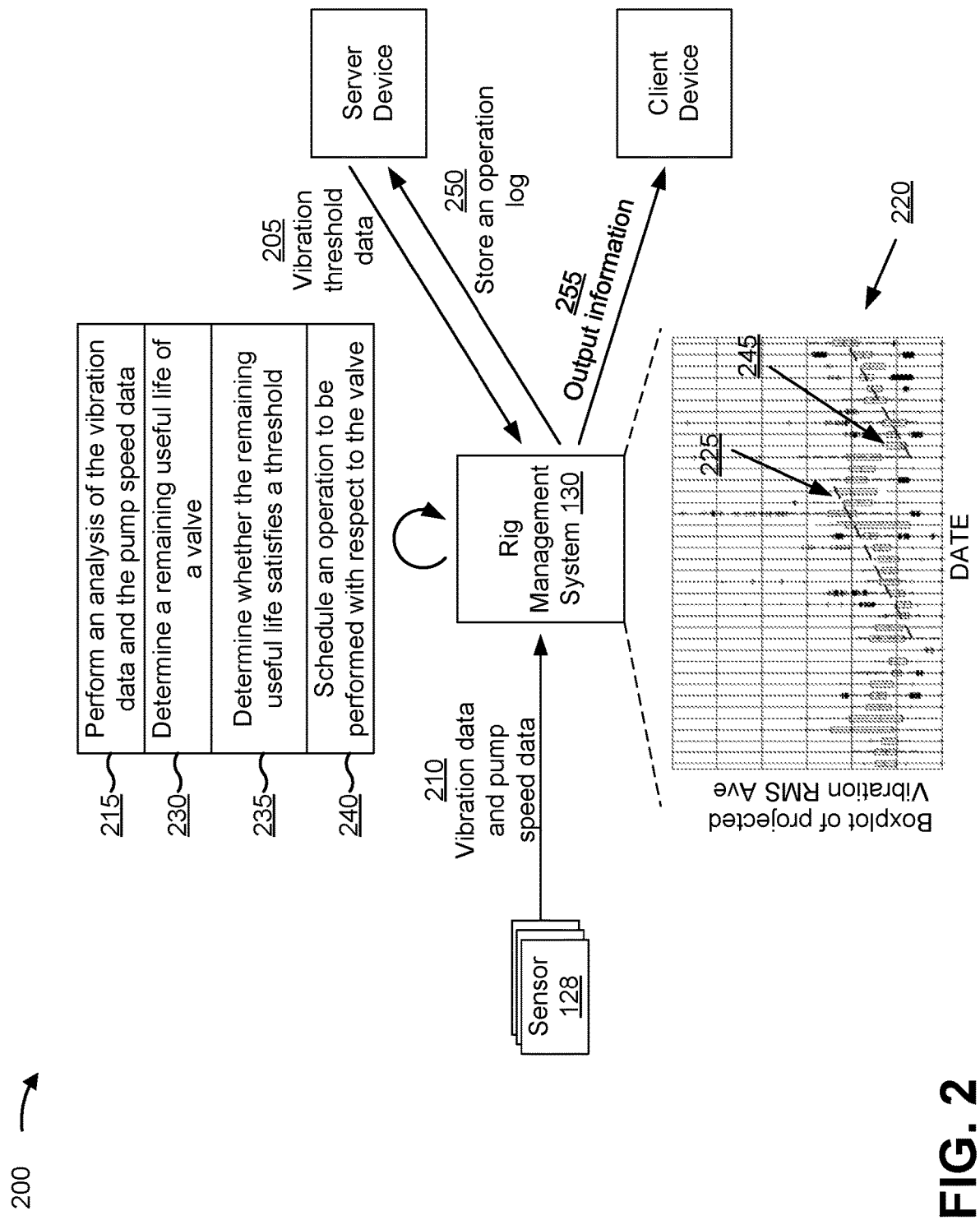
FIG. 2 is a diagram of an example of analyzing a pump valve of the hydraulic fracturing system of FIG. 1 described herein.

FIG. 2 is a diagram 200 of an example of analyzing a pump valve of the hydraulic fracturing system of FIG. 1 described herein. As shown in FIG. 2, diagram 200 includes a set of sensors 128, rig management system 130, a server device, and a client device.

As shown by reference number 205, rig management system 130 may receive vibration threshold data. For example, rig management system 130 may receive the vibration threshold data from a server device, based on requesting the vibration threshold data, when hydraulic fracturing system 102 is deployed to worksite 112, based on hydraulic fracturing rig 104 being powered (e.g., based on engine 114, hydraulic fracturing pump 120, and/or the like being powered on), and/or the like. In some implementations, the vibration threshold data may identify a set of thresholds to be used to analyze vibration data from the set of sensors 128 related to vibrations of a valve associated with hydraulic fracturing pump 120. For example, the vibration threshold data may identify a set of thresholds for vibrations that are indicative of wear and tear of the valve, a failure of the valve, a remaining useful life of the valve, and/or the like. Additionally, or alternatively, rig management system 130 may receive a machine learning model to be used to process vibration data and/or pump speed data, as described elsewhere herein.

As shown by reference number 210, rig management system 130 may receive vibration data and pump speed data. For example, rig management system 130 may receive the vibration data and the pump speed data from the set of set of sensors 128. Continuing with the previous example, rig management system 130 may receive the vibration data from a first set of sensors 128 installed on outlet pipe 122 and/or on inlet pipe 124. Additionally, or alternatively, and continuing still with the previous example, rig management system 130 may receive the pump speed data from a second set of sensors 128 installed on hydraulic fracturing pump 120. In some implementations, rig management system 130 may receive the vibration data and/or the pump speed data when hydraulic fracturing rig 104 is in operation, in real-time or near real-time, based on requesting the vibration data and/or the pump speed data from the set of sensors 128, periodically, according to a schedule, and/or the like.

In some implementations, the vibration data may identify a measure of vibration of a valve associated with hydraulic fracturing rig 104. For example, the vibration data may identify a measure of vibration of a valve associated with hydraulic fracturing pump 120, with outlet pipe 122, and/or with inlet pipe 124. In some implementations, the vibration data may be in units of gravity (g), may indicate a force of a vibration of the valve, may indicate a pattern of the vibration of the valve, and/or the like. Additionally, or alternatively, the vibration data may be time-series data (e.g., may identify a vibration of the valve over time).

In some implementations, the pump speed data may identify a pump speed of hydraulic fracturing pump 120 during operation of hydraulic fracturing rig 104. For example, the pump speed data may identify a volume of fluid per unit of time being pumped by hydraulic fracturing pump 120, a flow rate of hydraulic fracturing pump 120, a rotational speed of hydraulic fracturing pump 120 (or one or more components of hydraulic fracturing pump 120), a suction speed of hydraulic fracturing pump 120, a discharge speed of hydraulic fracturing pump 120, and/or the like. In some implementations, the pump speed data may be in units of pump specific speed ($N_s$), net suction specific speed ($N_{ss}$), and/or the like. In some implementations, the pump speed data may be time-series data.

In some implementations, and after receiving the vibration data and the pump speed data, rig management system 130 may normalize the vibration data and the pump speed data. For example, rig management system 130 may normalize the vibration data to a particular pump speed, such as to facilitate a more accurate analysis of vibration data via use of a consistent pump speed.

In some implementations, rig management system 130 may select, as the pump speed to which the vibration data is to be normalized, an average pump speed since a previous replacement of a valve and/or during a time period, a maximum pump speed since a previous replacement of the valve and/or during a time period, a minimum pump speed since a replacement of the valve and/or during a time period, and/or the like. In some implementations, to normalize the vibration data to a pump speed, rig management system 130 may multiply the vibration data by a number, may apply a function to the vibration data, and/or the like. For example, if the vibration data is 3g at a pump speed of 60 revolutions per second (rps), and the selected pump speed is 120 rps, then rig management system 130 may multiply 3g by 2 (e.g., the quotient of 120 rps divided by 60 rps) to normalize the vibration data to 120 rps (e.g., assuming a linear relationship between vibrations and pump speed). In some implementations, rig management system 130 may process vibration data in a different manner if the relationship between the vibration data and the pump speed data is not linear (e.g., may process the vibration data based on an exponential relationship, using a multiplier other than a quotient of dividing the selected pump speed and an actual pump speed, and/or the like).

In some implementations, rig management system 130 may perform additional processing of the vibration data and/or the pump speed data, after receiving the vibration data and/or the pump speed data, to improve an accuracy and/or a usability of the vibration data and/or the pump speed data. For example, rig management system 130 may remove outliers from the vibration data and/or the pump speed data (e.g., that are outside of a threshold standard deviation from a mean of the vibration data and/or the pump speed data), may aggregate the vibration data and/or the pump speed data into an average for a time period (e.g., an average for an hour, a day, a week, etc.), may remove high and low values from the vibration data and/or the pump speed data (e.g., during a time period), and/or the like.

As shown by reference number 215, rig management system 130 may perform an analysis of the vibration data and the pump speed data. For example, rig management system 130 may perform the analysis after normalizing the vibration data to a particular pump speed and/or after performing other types of processing described above. In some implementations, rig management system 130 may perform the analysis after receiving the vibration data and/or the pump speed data, according to a schedule, periodically, for a time period (e.g., utilizing a moving window for the data where, for example, only data from the last hour, day, week, etc. is analyzed), based on receiving input from a user of rig management system 130 and/or the client device to perform the analysis, in real-time or near real-time, and/or the like.

In some implementations, when performing the analysis, rig management system 130 may identify a trend and/or a pattern in the vibration data (e.g., during a time period). For example, rig management system 130 may determine whether the vibration data identifies increasing or decreasing values for detected vibrations during a time period, may determine a rate of increasing or decreasing values for the vibrations, may determine whether a vibration pattern matches an expected vibration pattern (e.g., whether higher or lower high values are present than expected, whether higher or lower low values are present than expected, whether a non-uniform pattern of vibrations is present, and/or the like), and/or the like.

Additionally, or alternatively, rig management system 130 may determine whether the vibration data satisfies a threshold. For example, rig management system 130 may determine whether an average value of vibrations during a time period satisfies a threshold, whether the values in the vibration data satisfy a threshold for a threshold amount of time, whether a difference between values for vibration data for a first time period and values for vibration data for a second time period satisfies a threshold, and/or the like.

In some implementations, when performing the analysis, rig management system 130 may use a model that has been trained to detect an issue (e.g., an existing issue or an impending issue), a failure (e.g., an existing failure or an impending failure), and/or the like related to operation of a valve using a training set of data that includes different sets of vibration data and information that identifies whether the vibration data is indicative of an issue, a failure, and/or the like. For example, the training set of data may include a first set of vibration data and a first indication as to whether the first set of vibration data is indicative of an issue, a failure, and/or the like, a second set of vibration data and a second indication as to whether the second set of vibration data is indicative or an issue, a failure, and/or the like, and so forth.

In some implementations, rather than training a model, rig management system 130 may receive a model from another device. For example, the server device may generate the model based on having trained the model in a manner similar to that described above and may provide the model to rig management system 130 (e.g., may pre-load rig management system 130 with the model, may receive a request from rig management system 130 for the model, and/or the like).

In some implementations, the model may indicate whether a valve associated with hydraulic fracturing pump 120 is experiencing an issue, whether the valve has failed, whether the valve is predicted to experience an issue in a period of time, whether the valve is predicted to experience a failure in a period of time, an amount of wear and tear the valve has experienced, a remaining useful life of the valve, and/or the like. For example, rig management system 130 may input real-time or near real-time vibration data (e.g., that has been normalized to a pump speed) into the model to determine whether the valve is experiencing an issue, whether the valve has experienced a failure, whether the valve is predicted to experience an issue in a period of time, whether the valve is predicted to experience a failure in a period of time, a remaining useful life of the valve, an amount of wear and tear the valve has experienced, and/or the like based on the manner in which the model was trained. For example, the model may output an indication of whether the valve is experiencing an issue, whether the valve has experienced a failure, whether the valve is predicted to experience an issue in a period of time, whether the valve is predicted to experience a failure in a period of time, a remaining useful life of the valve, an amount of wear and tear the valve has experienced, and/or the like based on the vibration data (e.g., based on a trend and/or pattern in the vibration data that the model has been trained to identify). Additionally, or alternatively, the model may output a recommended operation to be performed with respect to the valve and/or scheduling of the operation (e.g., maintenance, replacement, servicing, inspection, and/or the like), as described in more detail elsewhere herein.

In some implementations, rig management system 130 may identify a model to use. For example, rig management system 130 may store various models and rig management system 130 may identify a particular model to use to process the vibration data. In some implementations, rig management system 130 may identify a model based on information that identifies a type of the valve for which the vibration data was gathered and/or a type of sensor 128 that gathered the vibration data. For example, different models may be associated with different sizes of valves, different manufacturers of valves and/or sensors 128, different configurations of components included in valves and/or sensors 128, different materials from which valves can be fabricated, different sensitivities of sensors 128, and/or the like.

Additionally, or alternatively, rig management system 130 may identify a model based on a location of a valve and/or sensor 128. For example, rig management system 130 may use a different model for a valve and/or sensor 128 associated with outlet pipe 122 versus another a valve and/or sensor 128 associated with inlet pipe 124. Additionally, or alternatively, rig management system 130 may identify a model based on processing that rig management system 130 performed on the vibration data and/or the pump speed data prior to performing the analysis. For example, different models may be associated with different manners in which the vibration data was normalized, different pump speeds to which the vibration data was normalized, a time period to which the vibration data and/or the pump speed data was aggregated (e.g., averaged), and/or the like.

Additionally, or alternatively, rig management system 130 may use operating condition data that identifies an operating condition of hydraulic fracturing system 102 to identify a model. For example, operating condition data may identify a soil composition of worksite 112, a soil moisture of worksite 112, a temperature (e.g., air temperature or ground temperature) of worksite 112, an operating life of components of hydraulic fracturing rig 104, and/or the like, and may select a model based on this information. Continuing with the previous example, rig management system 130 may select a model based on this information as these factors may impact an expected useful life of a valve (e.g., may increase or decrease the useful life), may impact vibration data gathered by sensor 128 (e.g., may cause an amount of vibrations detected to be increased or decreased, may cause values of the vibration data to be higher or lower than expected, and/or the like), and/or the like.

In some implementations, rig management system 130 may perform an initial analysis of the vibration data and/or the pump speed data prior to selecting a model. For example, rig management system 130 may analyze a trend, may analyze a pattern, may determine whether the vibration data satisfies a threshold during a time period, and/or the like prior to selecting a model to use. In some implementations, rig management system 130 may select a model based on whether the initial analysis indicates an issue with operation of a valve, a threshold remaining useful life of the valve, a failure of the valve, a threshold amount of wear and tear on the valve, and/or the like, and rig management system 130 may use the model to confirm results of the initial analysis.

This conserves processing resources by reducing or eliminating a need for rig management system 130 to process the vibration data and/or the pump speed data if a result of an initial analysis does not indicate an issue (e.g., existing issue or impending issue) with operation of a valve, a threshold remaining useful life of the valve, a failure (e.g., actual failure or impending failure) of the valve, a threshold amount of wear and tear on the valve, and/or the like. In addition, this increases an accuracy of processing the vibration data and/or the pump speed data utilizing a model by facilitating selection of a model that has been specifically trained to identify different aspects of operation of a valve, which can improve an accuracy of determining a remaining useful life of the valve.

Reference number 220 shows an example of vibration data over time on which rig management system 130 may perform an analysis in a manner similar to that described elsewhere herein. For example, and as shown by reference number 225, rig management system 130 may identify a trend of increasing values of vibrations of a valve, may detect a threshold value of a vibration (e.g., a threshold value during a time period, such as a threshold average value during a time period, for a threshold amount of time, and/or the like), and/or the like. In some implementations, and based on this, rig management system 130 may determine that the valve is experiencing an issue, may determine that the valve has experienced a failure, may determine that the valve has experienced a threshold amount of wear and tear, and/or the like.

As shown by reference number 230, rig management system 130 may determine a remaining useful life of a valve. For example, rig management system 130 may determine a remaining useful life of a valve after performing an analysis of the vibration data and/or the pump speed data, based on a result of performing the analysis, and/or the like. In some implementations, when determining a remaining useful life of the valve, rig management system 130 may determine a time in the future when the valve is expected to fail and/or is expected to need to be replaced, a percentage of the useful life of the valve that is remaining and/or that has elapsed, an amount of operating time of hydraulic fracturing pump 120 for which the valve can be used (e.g., a quantity of operating minutes, hours, days, and/or the like), and/or the like.

In some implementations, rig management system 130 may determine a remaining useful life of a valve based on a trend and/or a pattern identified in the vibration data. For example, rig management system 130 may extrapolate the vibration data to a future time based on the trend and/or the pattern in the data to predict a time when values included in the vibration data will satisfy a threshold, will indicate a threshold amount of wear and tear experienced by the valve, and/or the like. Continuing with the previous example, rig management system 130 may extrapolate the vibration data based on a rate at which values in the vibration data are changing, by deriving a formula for a trend line identified in the data, and/or the like, and determining future values based on this information.

Additionally, or alternatively, rig management system 130 may determine a remaining useful life of the valve based on whether the vibration data satisfies a threshold. For example, different thresholds may be indicative of different amounts of remaining useful life of the valve (e.g., a first threshold may be indicative of a first amount of remaining useful life, a second threshold may be indicative of a second amount of remaining useful life, and so forth), and rig management system 130 may determine the amount of remaining useful life based on a particular threshold that the vibration data has satisfied.

Additionally, or alternatively, rig management system 130 may determine a remaining useful life for the valve utilizing a model similar to other models described elsewhere herein. For example, the model may be trained to determine a remaining useful life of a valve based on the vibration data, based on a result of performing an analysis of the vibration data, and/or the like. Continuing with the previous example, rig management system 130 may input vibration data and/or a result of performing an analysis into the model, and the model may output a remaining useful life predicted for the valve, in a manner similar to that described elsewhere herein for other models.

In some implementations, rig management system 130 may update the remaining useful life of the valve as additional vibration data and/or pump speed data is received from sensor 128. This improves an accuracy of determining a remaining useful life of the valve, reduces a likelihood of an unexpected failure of the valve, and/or the like.

As shown by reference number 235, rig management system 130 may determine whether the remaining useful life satisfies a threshold. For example, rig management system 130 may determine whether the remaining useful life satisfies a threshold after determining the remaining useful life.

In some implementations, when determining whether the remaining useful life of the valve satisfies a threshold, rig management system 130 may determine whether an amount of time that the valve can be used satisfies a threshold, whether an amount of wear and tear that the valve can still experience prior to a failure of the valve satisfies a threshold, and/or the like. In some implementations, rig management system 130 may monitor the remaining useful life of the valve (e.g., may monitor an updated remaining useful life as updated vibration data and/or pump speed data is received from sensor 128) and determine whether the remaining useful life satisfies a threshold (e.g., periodically, according to a schedule, as an updated remaining useful life is determined, and/or the like).

In some implementations, if rig management system 130 determines that the remaining useful life satisfies the threshold, then rig management system 130 may continue to monitor the vibration data and/or the pump speed data in the manner described above. Conversely, if rig management system 130 determines that the remaining useful life does not satisfy the threshold, then rig management system 130 may schedule an operation to be performed with respect to the valve, as described elsewhere herein.

As shown by reference number 240, rig management system 130 may schedule an operation to be performed with respect to the valve. For example, rig management system 130 may schedule an operation based on the remaining useful life of the valve, after determining that the remaining useful life of the valve does not satisfy the threshold, and/or the like.

In some implementations, rig management system 130 may schedule a replacement of the valve, a repair of the valve, an inspection of the valve, and/or the like. For example, rig management system 130 may communicate with the server device and/or the client device to generate a work ticket for the operation and/or to cause a ticket system to be populated with the work ticket. In some implementations, rig management system 130 may schedule the operation for a particular time after determining that the remaining useful life does not satisfy the threshold, for a particular time prior to an end of the remaining useful life, and/or the like.

In some implementations, rig management system 130 may perform one or more actions in association with scheduling the operation. For example, rig management system 130 may trigger an alarm if the remaining useful life does not satisfy a particular threshold, may stop operation of hydraulic fracturing rig 104 (e.g., by stopping engine 114, hydraulic fracturing pump 120, and/or the like) to facilitate performance of the operation and/or to prevent damage to the valve and/or hydraulic fracturing rig 104, may output information for display (e.g., via a display associated with rig management system 130 and/or the client device) that identifies that the remaining useful life does not satisfy the threshold, may store a log of information in memory resources associated with the server device related to determining that the remaining useful life does not satisfy the threshold, and/or the like.

In some implementations, rig management system 130 may determine the operation to be performed with respect to the valve prior to scheduling the operation. For example, rig management system 130 may determine whether the valve is to be replaced, is to be repaired, is to be inspected, and/or the like. In some implementations, rig management system 130 may determine an operation based on a remaining useful life of the valve. For example, different thresholds related to a remaining useful life of the valve may be associated with different operations, and rig management system 130 may determine the operation based on a particular threshold that the remaining useful life satisfies.

Additionally, or alternatively, rig management system 130 may determine an operation based on processing information that identifies the remaining useful life, processing the vibration data, processing the pump speed data, and/or the like using a model similar to that described elsewhere herein. For example, the model may be trained to output information that identifies a likelihood that the pump will fail prior to the remaining useful life elapsing, and rig management system 130 may determine an operation based on the likelihood satisfying a threshold (e.g., rig management system 130 may determine that an inspection is needed for a low likelihood, may determine that a repair is needed for a moderate likelihood, may determine that a replacement is needed for a high likelihood, and/or the like).

Additionally, or alternatively, rig management system 130 may determine an operation to be performed with respect to the valve based on a result of performing an analysis of the vibration data and/or the pump speed data. For example, a result of performing the analysis may indicate an amount of wear and tear experienced by the valve, may indicate that the valve is experiencing an abnormal pattern of vibrations, may indicate that the valve has failed, and/or the like, and rig management system 130 may determine the operation based on these results (e.g., may determine that an inspection is needed when a threshold amount of wear and tear is detected, may determine that a repair and/or a replacement is needed when an abnormal pattern of vibrations is detected, may determine that a replacement is needed when a failure is detected, and/or the like).

In some implementations, rig management system 130 may detect performance of the operation. For example, rig management system 130 may detect performance of the operation based on detecting a change in the vibration data and/or the pump speed data received from the set of sensors 128. Continuing with the previous example, rig management system 130 may detect a reduction in a value of the vibration data (e.g., a threshold reduction, a threshold reduction for a threshold amount of time, and/or the like), may detect a normal pattern of vibrations in the vibration data, and/or the like, which may indicate a repair and/or a replacement of the valve. Additionally, or alternatively, rig management system 130 may receive input from a user of rig management system 130 that indicates that the operation was performed. Additionally, or alternatively, the valve may include various computing components (e.g., sensors, processors, and/or the like) to monitor operation of the valve, and rig management system 130 may detect a replacement of the valve based on information received from these computing components (e.g., by detecting a new unique identifier for the valve).

Reference number 245 shows an example of detecting an operation performed with respect to the valve. For example, rig management system 130 may detect a threshold decrease in average values of the vibration data (e.g., from the data associated with reference number 225), and may detect a repair and/or a replacement of the valve based on this decrease.

In some implementations, rig management system 130 may perform one or more actions after scheduling the operation and/or detecting the operation. For example, and as shown by reference number 250, rig management system 130 may store an operation log in memory resources associated with the server device (e.g., after generating the log). Continuing with the previous example, the operation log may include information that identifies the operation performed with respect to the valve, a timestamp for performance of the operation, vibration data and/or pump speed data received after performance of the operation, a technician that performed the operation (e.g., as identified in input to rig management system 130 from the technician, as identified in information from the client device when connected to rig management system 130 during the operation, and/or the like), and/or the like.

Additionally, or alternatively, and as shown by reference number 255, rig management system 130 may output information. For example, rig management system 130 may output information related to performance of the operation via a display associated with the client device. Additionally, or alternatively, rig management system 130 may start hydraulic fracturing rig 104 (e.g., may start engine 114, hydraulic fracturing pump 120, and/or the like). Additionally, or alternatively, rig management system 130 may deactivate an alarm. Additionally, or alternatively, rig management system 130 may re-initiate monitoring of vibration data and/or pump speed data from the set of sensors 128.

As indicated above, FIG. 2 is provided as an example. Other examples are possible and may differ from what was described in connection with FIG. 2.

Figure 3:
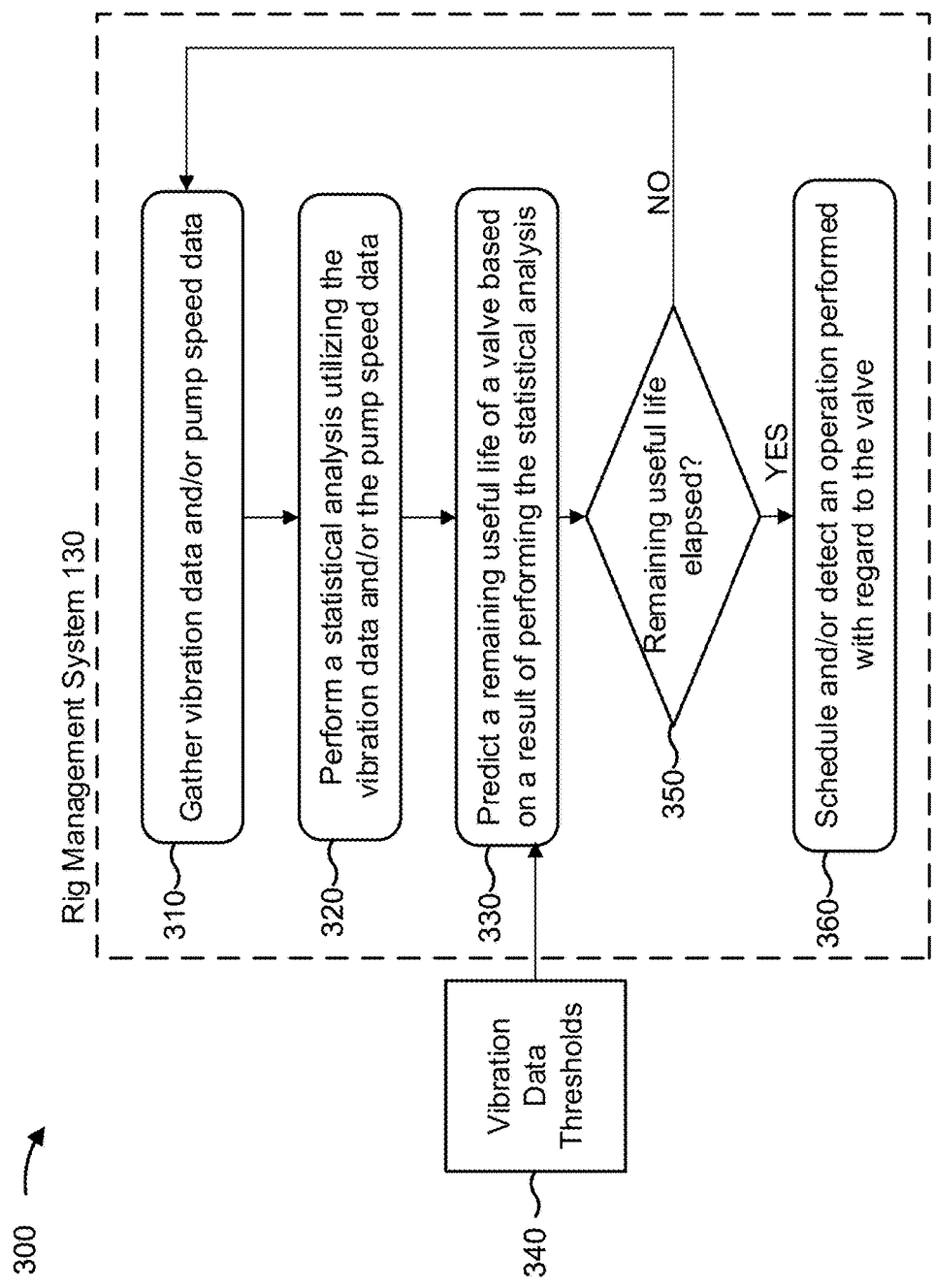
FIG. 3 is a diagram of an example of analyzing a pump valve of the hydraulic fracturing system of FIG. 1 described herein.

FIG. 3 is a diagram 300 of an example of analyzing a pump valve of the hydraulic fracturing system of FIG. 1 described herein. As shown in FIG. 3, diagram 300 includes rig management system 130.

As shown in FIG. 3, and by reference number 310, rig management system 130 may gather vibration data and/or pump speed data. For example, rig management system 130 may gather the vibration data and/or the pump speed data in a manner similar to that described elsewhere herein (e.g., from sensor 128, in real-time or near real-time, and/or the like). As shown by reference number 320, rig management system 130 may perform a statistical analysis utilizing the vibration data and/or the pump speed data. For example, rig management system 130 may perform the statistical analysis in a manner similar to that described elsewhere herein. Continuing with the previous example, rig management system 130 may normalize the vibration data to a pump speed, may process the vibration data and/or the pump speed data to identify a trend and/or a pattern in the vibration data and/or the pump speed data, may process the vibration data and/or the pump speed data utilizing a model, and/or the like.

As shown by reference number 330, rig management system 130 may predict a remaining useful life of a valve based on a result of performing the statistical analysis. For example, rig management system 130 may predict a remaining useful life of a valve (e.g., associated with hydraulic fracturing pump 120, outlet pipe 122, inlet pipe 124, and/or the like), in a manner similar to that described elsewhere herein. Continuing with the previous example, rig management system 130 may predict the remaining useful life based on whether values of the vibration data satisfy a threshold, utilizing a model, and/or the like.

A shown by reference number 340, rig management system 130 may receive vibration data thresholds, and may use these thresholds when predicting the remaining useful life. For example, rig management system 130 may receive the vibration data thresholds from a server device (not shown), and may use the vibration data thresholds to predict the remaining useful life, in a manner similar to that described elsewhere herein.

As shown by reference number 350, rig management system 130 may determine whether the remaining useful life has elapsed. For example, rig management system 130 may determine whether an amount of time between when rig management system 130 predicted the remaining useful life and an end of the remaining useful life has elapsed, may determine whether the valve has failed or is associated with a threshold likelihood of failing within a time period, and/or the like. In some implementations, if rig management system 130 determines that the remaining useful life has not elapsed (reference number 350-NO), then rig management system 130 may continue to gather the vibration data and/or the pump speed data.

As shown by reference number 360, if rig management system 130 determines that the remaining useful life has elapsed (reference number 350-YES), then rig management system 130 may schedule and/or detect an operation performed with regard to the valve. For example, rig management system 130 may schedule and/or detect an operation in a manner similar to that described elsewhere herein. Continuing with the previous example, rig management system 130 may schedule and/or detect an inspection, a repair, a replacement, and/or the like of the valve based on updated vibration data and/or pump speed data.

As indicated above, FIG. 3 is provided as an example. Other examples are possible and may differ from what was described in connection with FIG. 3. Although FIG. 3 shows example blocks of a process, in some implementations, the process may include additional blocks, fewer blocks, different blocks, or differently arranged blocks than those depicted in FIG. 3. Additionally, or alternatively, two or more of the blocks of the process may be performed in parallel.

Figure 4:
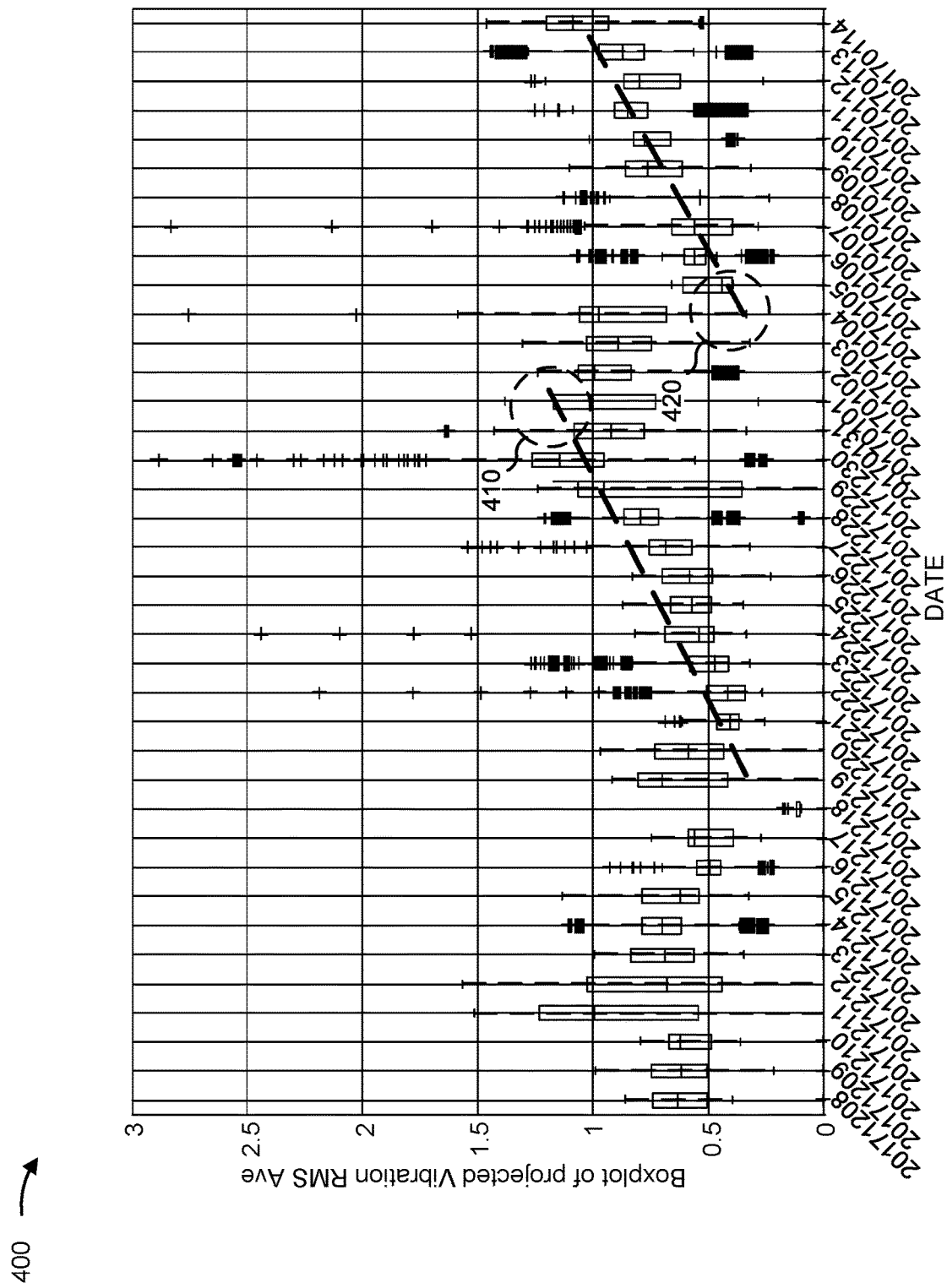
FIG. 4 is a diagram of an example of analyzing a pump valve of the hydraulic fracturing system of FIG. 1 described herein.

FIG. 4 is a diagram 400 of an example of analyzing a pump valve of the hydraulic fracturing system of FIG. 1 described herein. FIG. 4 shows an example of processing vibration data in a manner similar to that described elsewhere herein.

As shown by reference number 410, rig management system 130 may process the vibration data to detect a trend in the vibration data, to detect a pattern in the vibration data, to determine whether values of the vibration data satisfy a threshold, and/or the like. For example, and as shown in FIG. 4, rig management system 130 may determine that values of the vibration data have been increasing over a threshold amount of time by a threshold amount, that the values satisfy a threshold, and/or the like, in a manner similar that described elsewhere herein.

As shown by reference number 420, rig management system 130 may detect an operation performed with respect to a valve. For example, rig management system 130 may detect an operation based on detecting a threshold decrease in values of the vibration data, a threshold decrease for a threshold amount of time, and/or the like, in a manner similar to that described elsewhere herein.

As indicated above, FIG. 4 is provided as an example. Other examples are possible and may differ from what was described in connection with FIG. 4.

Figure 5:
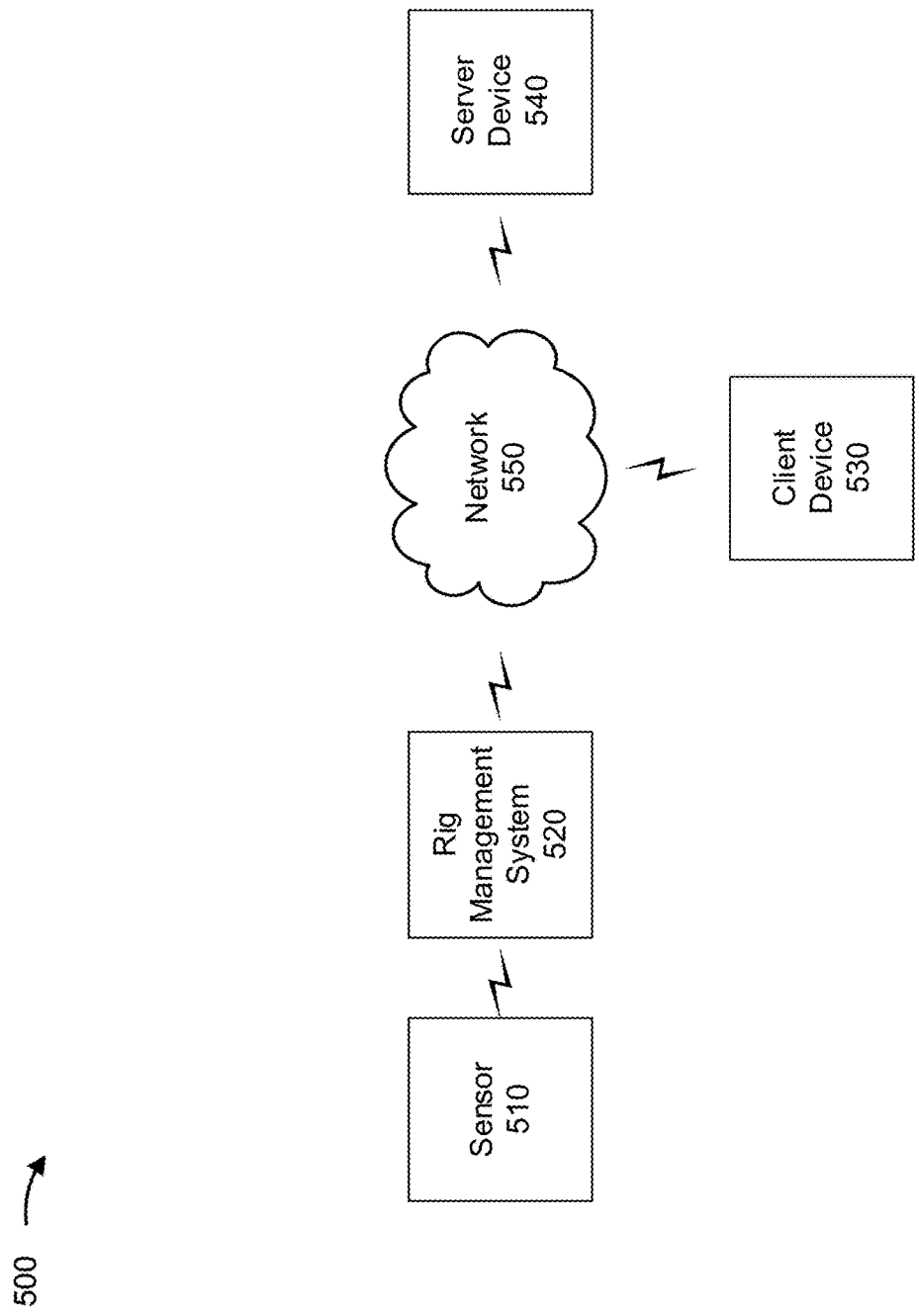
FIG. 5 is a diagram of an example environment in which systems, devices, and/or methods, described herein, may be implemented.

FIG. 5 is a diagram of an example environment 500 in which systems and/or methods, described herein, may be implemented. As shown in FIG. 5, environment 500 may include a sensor 510, a rig management system 520, a client device 530, a server device 540, and a network 550. Devices of environment 500 may interconnect via wired connections, wireless connections, or a combination of wired and wireless connections.

Sensor 510 includes one or more device capable of receiving, generating, storing, processing, and/or providing vibration data and/or pump data. For example, sensor 510 may include a vibration sensor installed on outlet pipe 122 and/or on inlet pipe 124, a pump speed sensor installed on hydraulic fracturing pump 120, and/or the like. In some implementations, sensor 510 may gather vibration data and/or pump speed data, as described elsewhere herein. Additionally, or alternatively, sensor 510 may provide the vibration data and/or the pump speed data to rig management system 520, as described elsewhere herein.

Rig management system 520 includes one or more devices capable of receiving, generating, storing, processing, and/or providing vibration data and/or pump data, such as to determine a remaining useful life of a valve. For example, rig management system 520 may include a system installed in operator control station 106, in a data center, on server device 540, and/or the like. In some implementations, rig management system 520 may receive vibration data and/or pump speed data from sensor 510, as described elsewhere herein. Additionally, or alternatively, rig management system 520 may process the vibration data and/or the pump speed data to determine a remaining useful life of a valve, as described elsewhere herein.

Client device 530 includes one or more devices capable of receiving, generating, storing, processing, and/or providing vibration data and/or pump speed data, a result of processing the vibration data and/or the pump speed data, and/or the like. For example, client device 530 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 530 may receive, from rig management system 520, information related to processing vibration data and/or pump speed data, in a manner similar to that described elsewhere herein.

Server device 540 includes one or more devices capable of receiving, generating, storing, processing, and/or providing vibration data and/or pump speed data, a result of processing the vibration data and/or the pump speed data, and/or the like. For example, server device 540 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 540 may include a communication interface that allows server device 540 to receive information from and/or transmit information to other devices in environment 500. In some implementations, server device 540 may be a physical device implemented within a housing, such as a chassis. In some implementations, server device 540 may be a virtual device implemented by one or more computer devices of a cloud computing environment or a data center. In some implementations, server device 540 may provide, to rig management system 520, information related to processing vibration data and/or pump speed data, as described elsewhere herein.

Network 550 includes one or more wired and/or wireless networks. For example, network 550 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
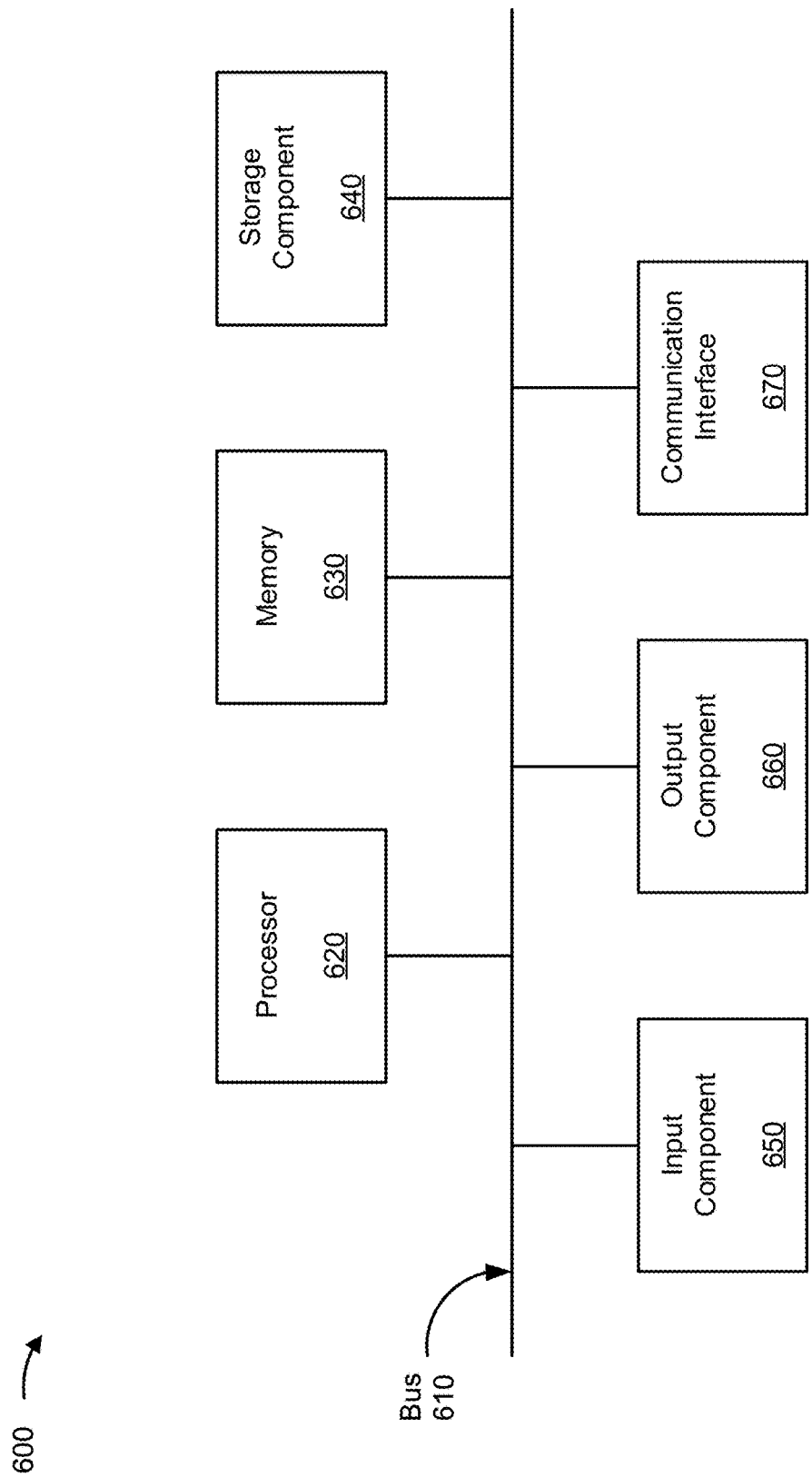
FIG. 6 is a diagram of example components of one or more systems and/or devices described herein.

FIG. 6 is a diagram of example components of a device 600. Device 600 may correspond to sensor 510, rig management system 520, client device 530, and/or server device 540. In some implementations, sensor 510, rig management system 520, client device 530, and/or server device 540 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes based on to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
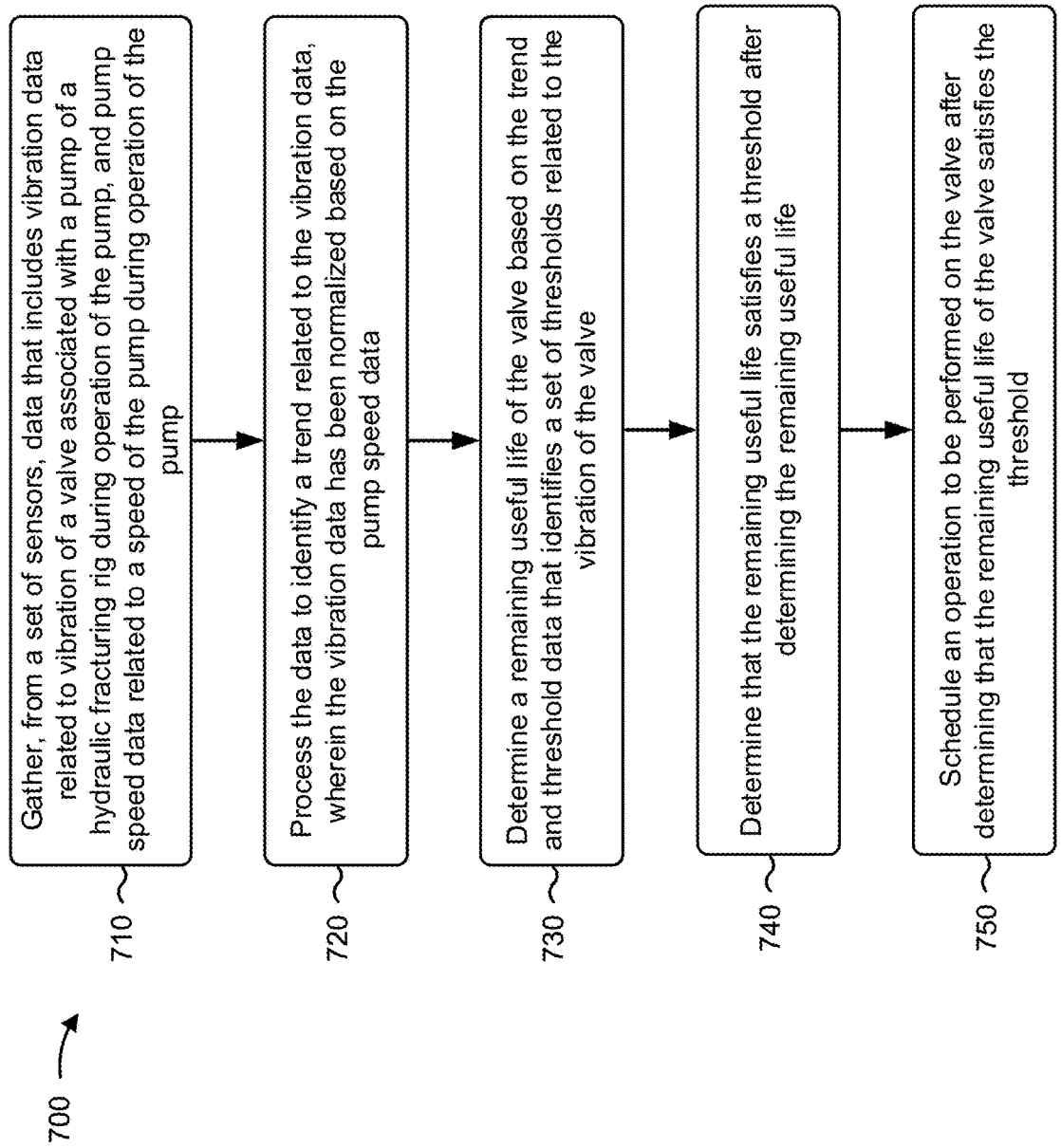
FIG. 7 is a flow chart of an example process for analyzing a pump valve of the hydraulic fracturing system of FIG. 1.

FIG. 7 is a flow chart of an example process 700 for analyzing a pump valve of the hydraulic fracturing system of FIG. 1. In some implementations, one or more process blocks of FIG. 7 may be performed by a rig management system (e.g., rig management system 130 and/or rig management system 520). In some implementations, one or more process blocks of FIG. 7 may be performed by another device or a group of devices separate from or including the rig management system, such as a sensor (e.g., sensor 128 and/or sensor 510), a client device (e.g., client device 530), and a server device (e.g., server device 540).

As shown in FIG. 7, process 700 may include gathering, from a set of sensors, data that includes vibration data related to vibration of a valve associated with a pump of a hydraulic fracturing rig during operation of the pump, and pump speed data related to a speed of the pump during operation of the pump (block 710). For example, the rig management system (e.g., rig management system 130 and/or rig management system 520 using processor 620, input component 650, communication interface 670, and/or the like) may gather, from a set of sensors, data that includes vibration data related to vibration of a valve associated with a pump of a hydraulic fracturing rig during operation of the pump, and pump speed data related to a speed of the pump during operation of the pump, in a manner that is the same as or similar to that described elsewhere herein.

As further shown in FIG. 7, process 700 may include processing the data to identify a trend related to the vibration data, wherein the vibration data has been normalized based on the pump speed data (block 720). For example, the rig management system (e.g., rig management system 130 and/or rig management system 520 using processor 620, and/or the like) may process the data to identify a trend related to the vibration data, in a manner that is the same as or similar to that described elsewhere herein. In some implementations, the vibration data has been normalized based on the pump speed data.

As further shown in FIG. 7, process 700 may include determining a remaining useful life of the valve based on the trend and threshold data that identifies a set of thresholds related to the vibration of the valve (block 730). For example, the rig management system (e.g., rig management system 130 and/or rig management system 520 using processor 620, and/or the like) may determine a remaining useful life of the valve based on the trend and threshold data that identifies a set of thresholds related to the vibration of the valve, in a manner that is the same as or similar to that described elsewhere herein.

As further shown in FIG. 7, process 700 may include determining that the remaining useful life satisfies a threshold after determining the remaining useful life (block 740). For example, the rig management system (e.g., rig management system 130 and/or rig management system 520 using processor 620, and/or the like) may determine that the remaining useful life satisfies a threshold after determining the remaining useful life, in a manner that is the same as or similar to that described elsewhere herein.

As further shown in FIG. 7, process 700 may include scheduling an operation to be performed on the valve after determining that the remaining useful life of the valve satisfies the threshold (block 750). For example, the rig management system (e.g., rig management system 130 and/or rig management system 520 using processor 620, output component 660, communication interface 670, and/or the like) may schedule an operation to be performed on the valve after determining that the remaining useful life of the valve satisfies the threshold, in a manner that is the same as or similar to that described elsewhere herein.

Process 700 may include additional implementations, such as any single implementation or any combination of implementations described below and/or in connection with one or more other processes described elsewhere herein.

In some implementations, the rig management system may gather the vibration data from a first set of sensors installed on an inlet pipe associated with the hydraulic fracturing rig or on an outlet pipe associated with the hydraulic fracturing rig, and may gather the pump speed data from a second set of sensors installed on the pump. In some implementations, the first set of sensors and the second set of sensors are different.

In some implementations, the rig management system may process the data utilizing a machine learning model to identify the trend based on a pattern of the vibration data at a pump speed after normalizing the vibration data based on the pump speed data. In some implementations, the rig management system may send a message to another device to cause a technician to be deployed to a location of the hydraulic fracturing rig at a particular time after determining that the remaining useful life of the valve satisfies the threshold.

In some implementations, the rig management system may determine that updated vibration data does not satisfy one or more thresholds, of the set of thresholds, after scheduling the operation. In some implementations, the updated vibration data has been normalized based on updated pump speed data. In some implementations, the rig management system may detect the operation after determining that the updated vibration data does not satisfy the one or more thresholds.

In some implementations, the rig management system may detect the operation on the valve utilizing updated vibration data or updated pump speed data after scheduling the operation, may generate an operation log related to the operation after detecting the operation. In some implementations, the operation log includes information that identifies at least one of: a time of the operation, a type of the operation, or data gathered at the time of the operation or at a time of scheduling the operation. In some implementations, the rig management system may store the operation log after generating the operation log.

In some implementations, the rig management system may generate a report related to the operation or the operation log, and may output the report for display via a display associated with the device or another device.

Additionally, or alternatively, a process, described herein, may include gathering, from a set of sensors, data that includes vibration data related to vibration of a valve associated with a pump of a hydraulic fracturing rig during operation of the pump, and pump speed data related to a speed of the pump during operation of the pump. For example, the rig management system (e.g., rig management system 130 and/or rig management system 520 using processor 620, input component 650, communication interface 670, and/or the like) may gather, from a set of sensors, data that includes vibration data related to vibration of a valve associated with a pump of a hydraulic fracturing rig during operation of the pump, and pump speed data related to a speed of the pump during operation of the pump, in a manner that is the same as or similar to that described elsewhere herein.

Such a process may include normalizing the vibration data based on the pump speed data after gathering the data from the set of sensors. For example, the rig management system (e.g., rig management system 130 and/or rig management system 520 using processor 620, and/or the like) may normalize the vibration data based on the pump speed data after gathering the data from the set of sensors, in a manner that is the same as or similar to that described elsewhere herein.

Such a process may include determining a remaining useful life of the valve after normalizing the vibration data, wherein the remaining useful life of the valve is based on threshold data that identifies a set of thresholds related to the vibration of the valve. For example, the rig management system (e.g., rig management system 130 and/or rig management system 520 using processor 620, and/or the like) may determine a remaining useful life of the valve after normalizing the vibration data, in a manner that is the same as or similar to that described herein. In some implementations, the remaining useful life of the valve is based on threshold data that identifies a set of thresholds related to the vibration of the valve.

Such a process may include determining that the remaining useful life satisfies a threshold after determining the remaining useful life. For example, the rig management system (e.g., rig management system 130 and/or rig management system 520 using processor 620) may determine that the remaining useful life satisfies a threshold after determining the remaining useful life, in a manner that is the same as or similar to that described elsewhere herein.

Such a process may include scheduling an operation of the valve after determining that the remaining useful life of the valve satisfies the threshold. For example, the rig management system (e.g., rig management system 130 and/or rig management system 520 using processor 620, output component 660, communication interface 670, and/or the like) may schedule an operation of the valve after determining that the remaining useful life of the valve satisfies the threshold, in a manner that is the same as or similar to that described elsewhere herein.

Such a process may include additional implementations, such as any single implementation or any combination of implementations described below and/or in connection with one or more other processes described herein.

In some implementations, the set of sensors includes a first set of sensors installed on an inlet pipe associated with the hydraulic fracturing rig or on an outlet pipe associated with the hydraulic fracturing rig. In some implementations, the first set of sensors is configured to provide the vibration data. In some implementations, the set of sensors includes a second set of sensors installed on the pump. In some implementations, the second set of sensors is configured to provide the pump speed data. In some implementations, the first set of sensors and the second set of sensors are different.

In some implementations, the rig management system may process the data utilizing a machine learning model to identify a trend based on a pattern of the vibration data at a pump speed after normalizing the vibration data based on the pump speed data. In some implementations, the rig management system may schedule the operation for a time prior to when the remaining useful life is predicted to satisfy another threshold.

In some implementations, the rig management system may determine that updated vibration data does not satisfy one or more thresholds, of the set of thresholds, after scheduling the operation. In some implementations, the updated vibration data has been normalized based on updated pump speed data. In some implementations, the rig management system may detect the operation after determining that the updated vibration data does not satisfy the one or more thresholds.

In some implementations, the rig management system may trigger an alarm that indicates that the remaining useful life of the valve satisfies the threshold after determining that the remaining useful life satisfies the threshold. In some implementations, the rig management system may determine that the vibration data is associated with the valve, and not with one or more other valves, after gathering the data, and may normalize the vibration data after determining that the vibration data is associated with the valve.

Additionally, or alternatively, a process, described herein, may include gathering, from a set of sensors, data that includes vibration data related to vibration of a valve, of a set of valves, during operation of a hydraulic fracturing rig, or pump speed data related to a speed of a pump during operation of the hydraulic fracturing rig. For example, the rig management system (e.g., rig management system 130 and/or rig management system 520 using processor 620, input component 650, communication interface 670, and/or the like) may gather, from a set of sensors, data that includes vibration data related to vibration of a valve, of a set of valves, during operation of a hydraulic fracturing rig, or pump speed data related to a speed of a pump during operation of the hydraulic fracturing rig, in a manner that is the same as or similar to that described elsewhere herein.

Such a process may include performing a statistical analysis on the data after gathering the data, wherein the statistical analysis is related to normalizing the data or determining a remaining useful life of the valve. For example, the rig management system (e.g., rig management system 130 and/or rig management system 520 using processor 620, and/or the like) may perform a statistical analysis on the data after gathering the data, wherein the statistical analysis is related to normalizing the data or determining a remaining useful life of the valve, in a manner that is the same as or similar to that described elsewhere herein.

Such a process may include determining the remaining useful life of the valve after performing the statistical analysis on the data. For example, the rig management system (e.g., rig management system 130 and/or rig management system 520 using processor 620, and/or the like) may determine the remaining useful life of the valve after performing the statistical analysis on the data, in a manner that is the same as or similar to that described elsewhere herein.

Such a process may include determining that the remaining useful life satisfies a threshold after determining the remaining useful life. For example, the rig management system (e.g., rig management system 130 and/or rig management system 520 using processor 620, and/or the like) may determine that the remaining useful life satisfies a threshold after determining the remaining useful life, in a manner that is the same as or similar to that described elsewhere herein.

Such a process may include scheduling an operation of the valve after determining that the remaining useful life of the valve satisfies the threshold. For example, the rig management system (e.g., rig management system 130 and/or rig management system 520 using processor 620, output component 660, communication interface 670, and/or the like) may schedule an operation of the valve after determining that the remaining useful life of the valve satisfies the threshold, in a manner that is the same as or similar to that described elsewhere herein.

Such a process may include detecting the operation of the valve utilizing updated vibration data or updated pump speed data after scheduling the operation, wherein the updated vibration data or the updated pump speed data is gathered from the set of sensors. For example, the rig management system (e.g., rig management system 130 and/or rig management system 520 using processor 620, input component 650, communication interface 670, and/or the like) may detect the operation of the valve utilizing updated vibration data or updated pump speed data after scheduling the operation, in a manner that is the same as or similar to that described elsewhere herein. In some implementations, the updated vibration data or the updated pump speed data is gathered from the set of sensors.

Such a process may include additional implementations, such as any single implementation or any combination of implementations described below and/or in connection with one or more other processes described herein.

In some implementations, the rig management system may gather the vibration data from the set of sensors installed on an inlet pipe or on an outlet pipe, and may gather the pump speed data from the set of sensors installed on the pump. In some implementations, the rig management system may select a machine learning model from a set of machine learning models prior to performing the statistical analysis on the data. In some implementations, the machine learning model is associated with at least one of: the hydraulic fracturing rig, operating condition data that identifies an operating condition of the hydraulic fracturing rig, or the valve. In some implementations, the machine learning model is used for performing the statistical analysis.

In some implementations, the rig management system may determine a time at which the remaining useful life of the valve will have elapsed after determining that the remaining useful life satisfies the threshold, and may schedule the operation for prior to the time at which the remaining useful life of the valve will have elapsed. In some implementations, the rig management system may determine that the updated vibration data does not satisfy one or more thresholds after scheduling the operation. In some implementations, the updated vibration data has been normalized based on the updated pump speed data. In some implementations, the rig management system may detect the operation after determining that the updated vibration data does not satisfy the one or more thresholds. In some implementations, the rig management system may normalize the vibration data based on the pump speed data after gathering the data, and may perform the statistical analysis on the data after normalizing the data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

INDUSTRIAL APPLICABILITY

The disclosed rig management system (e.g., rig management system 130 and/or rig management system 520) may be used with any machine where a technique for analyzing a pump valve is needed. The disclosed rig management system may perform an analysis of vibration data and/or pump speed data related to a pump valve, and may predict a remaining useful life of the pump valve based on a result of the analysis. In addition, the rig management system may schedule and/or detect an operation performed on the pump valve. Particularly, the rig management system may perform these actions in the context of operating conditions of the machine with which the pump valve is associated, based on a type of pump valve used, and/or the like. As such, the rig management system may be capable of accurately predicting a remaining useful life of a pump valve, scheduling an operation to be performed on the pump valve, detecting performance of the operation, and/or the like when accurately performing these actions would otherwise be difficult or impossible (e.g., due to variability in vibrations of the pump valve).

This minimizes a likelihood of an unexpected failure of a pump valve during operation of a machine with which the pump valve is associated, thereby improving an operation of the machine and/or reducing or eliminating downtime of the machine due to a failure of the pump valve, reducing or eliminating downtime of the machine due to unnecessary inspections, and/or the like. In addition, this reduces costs associated with maintaining a machine that includes the pump valve by, for example, reducing or eliminating a need for back-up pump valves to be stored at a worksite of the machine, reducing or eliminating a need for personnel to be available on-call to perform an operation on the pump valve, and/or the like. Further, this reduces or eliminates a risk of damage to other elements of the machine (e.g., a hydraulic fracturing pump, an outlet pipe, an inlet pipe, and/or the like) due to failure and/or abnormal operation of the pump valve. Further, this facilitate quick, efficient, and/or automatic scheduling and/or recording of operations performed on a pump valve, thereby improving an efficiency of these actions, conserving processing resources related to performing these actions, reducing or eliminating missed scheduling and/or detection of an operation, and/or the like.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:
   gathering, by a device and from a set of sensors, data that includes:
      vibration data related to vibration of a valve associated with a pump of a hydraulic fracturing rig during operation of the pump, and
      pump speed data related to a speed of the pump during operation of the pump;
   processing, by the device, the data to identify a trend related to the vibration data,
      wherein the vibration data has been normalized based on the pump speed data;
   determining, by the device, a remaining useful life of the valve based on the trend and threshold data that identifies a set of thresholds related to the vibration of the valve;
   determining, by the device, that the remaining useful life satisfies a threshold after determining the remaining useful life; and
   scheduling, by the device, an operation to be performed on the valve after determining that the remaining useful life of the valve satisfies the threshold.

2. The method of claim 1, wherein gathering the data comprises:
gathering the vibration data from a first set of sensors installed on an inlet pipe associated with the hydraulic fracturing rig or on an outlet pipe associated with the hydraulic fracturing rig, and
gathering the pump speed data from a second set of sensors installed on the pump,
wherein the first set of sensors and the second set of sensors are different.

3. The method of claim 1, wherein processing the data to identify the trend comprises:
processing the data utilizing a machine learning model to identify the trend based on a pattern of the vibration data at a pump speed after normalizing the vibration data based on the pump speed data.

4. The method of claim 1, wherein scheduling the operation comprises:
sending a message to another device to cause a technician to be deployed to a location of the hydraulic fracturing rig at a particular time after determining that the remaining useful life of the valve satisfies the threshold.

5. The method of claim 1, further comprising:
determining that updated vibration data does not satisfy one or more thresholds, of the set of thresholds, after scheduling the operation,
wherein the updated vibration data has been normalized based on updated pump speed data; and
wherein detecting the operation comprises:
detecting the operation after determining that the updated vibration data does not satisfy the one or more thresholds.

6. The method of claim 1, further comprising:
detecting the operation on the valve utilizing updated vibration data or updated pump speed data after scheduling the operation;
generating an operation log related to the operation after detecting the operation,
wherein the operation log includes information that identifies at least one of:
a time of the operation,
a type of the operation, or
data gathered at the time of the operation or at a time of scheduling the operation; and
storing the operation log after generating the operation log.

7. The method of claim 6, further comprising:
generating a report related to the operation or the operation log; and
outputting the report for display via a display associated with the device or another device.

8. A rig management system, comprising:
one or more memories; and
one or more processors, communicatively coupled to the one or more memories, configured to:
gather, from a set of sensors, data that includes:
vibration data related to vibration of a valve associated with a pump of a hydraulic fracturing rig during operation of the pump, and
pump speed data related to a speed of the pump during operation of the pump;
normalize the vibration data based on the pump speed data after gathering the data from the set of sensors;
determine a remaining useful life of the valve after normalizing the vibration data,
wherein the remaining useful life of the valve is based on threshold data that identifies a set of thresholds related to the vibration of the valve;
determine that the remaining useful life satisfies a threshold after determining the remaining useful life; and
schedule an operation of the valve after determining that the remaining useful life of the valve satisfies the threshold.

9. The rig management system of claim 8, wherein the set of sensors includes:
a first set of sensors installed on an inlet pipe associated with the hydraulic fracturing rig or on an outlet pipe associated with the hydraulic fracturing rig,
wherein the first set of sensors is configured to provide the vibration data, and
a second set of sensors installed on the pump,
wherein the second set of sensors is configured to provide the pump speed data,
wherein the first set of sensors and the second set of sensors are different.

10. The rig management system of claim 8, wherein the one or more processors are further configured to:
process the data utilizing a machine learning model to identify a trend based on a pattern of the vibration data at a pump speed after normalizing the vibration data based on the pump speed data.

11. The rig management system of claim 8, wherein the one or more processors, when scheduling the operation, are configured to:
schedule the operation for a time prior to when the remaining useful life is predicted to satisfy another threshold.

12. The rig management system of claim 8, wherein the one or more processors are further configured to:
determine that updated vibration data does not satisfy one or more thresholds, of the set of thresholds, after scheduling the operation,
wherein the updated vibration data has been normalized based on updated pump speed data; and
detect the operation after determining that the updated vibration data does not satisfy the one or more thresholds.

13. The rig management system of claim 8, wherein the one or more processors are further configured to:
trigger an alarm that indicates that the remaining useful life of the valve satisfies the threshold after determining that the remaining useful life satisfies the threshold.

14. The rig management system of claim 8, wherein the one or more processors are further configured to:
determine that the vibration data is associated with the valve, and not with one or more other valves, after gathering the data; and
wherein the one or more processors, when normalizing the vibration data, are configured to:
normalize the vibration data after determining that the vibration data is associated with the valve.

15. A hydraulic fracturing rig that includes a pump, an inlet pipe connected to the pump, an outlet pipe connected to the pump, and a set of valves associated with the inlet pipe, and the outlet pipe, the hydraulic fracturing rig comprising:
a rig management system configured to:
gather, from a set of sensors, data that includes:
vibration data related to vibration of a valve, of the set of valves, during operation of the hydraulic fracturing rig, or pump speed data related to a speed of the pump during operation of the hydraulic fracturing rig;

perform a statistical analysis on the data after gathering the data,
    wherein the statistical analysis is related to normalizing the data or determining a remaining useful life of the valve;

determine the remaining useful life of the valve after performing the statistical analysis on the data;

determine that the remaining useful life satisfies a threshold after determining the remaining useful life;

schedule an operation of the valve after determining that the remaining useful life of the valve satisfies the threshold; and detect the operation of the valve utilizing updated vibration data or updated pump speed data after scheduling the operation,
    wherein the updated vibration data or the updated pump speed data is gathered from the set of sensors.

16. The hydraulic fracturing rig of claim 15, wherein the rig management system, when gathering the data, is configured to:

gather the vibration data from the set of sensors installed on the inlet pipe or on the outlet pipe, and gather the pump speed data from the set of sensors installed on the pump.

17. The hydraulic fracturing rig of claim 15, wherein the rig management system is further configured to:

select a machine learning model from a set of machine learning models prior to performing the statistical analysis on the data,
    wherein the machine learning model is associated with at least one of:
        the hydraulic fracturing rig,
        operating condition data that identifies an operating condition of the hydraulic fracturing rig, or
        the valve;
    wherein the machine learning model is used for performing the statistical analysis.

18. The hydraulic fracturing rig of claim 15, wherein the rig management system is further configured to:

determine a time at which the remaining useful life of the valve will have elapsed after determining that the remaining useful life satisfies the threshold; and wherein the rig management system, when scheduling the operation, is configured to:
    schedule the operation for prior to the time at which the remaining useful life of the valve will have elapsed.

19. The hydraulic fracturing rig of claim 15, wherein the rig management system is further configured to:

determine that the updated vibration data does not satisfy one or more thresholds after scheduling the operation,
    wherein the updated vibration data has been normalized based on the updated pump speed data; and wherein detecting the operation comprises:
    detecting the operation after determining that the updated vibration data does not satisfy the one or more thresholds.

20. The hydraulic fracturing rig of claim 15, wherein the rig management system is further configured to:

normalize the vibration data based on the pump speed data after gathering the data; and wherein the rig management system, when performing the statistical analysis on the data, is configured to:
    perform the statistical analysis on the data after normalizing the data.

* * * * *